(12) United States Patent
Matsui et al.

(10) Patent No.: US 9,626,330 B2
(45) Date of Patent: Apr. 18, 2017

(54) INFORMATION PROCESSING APPARATUS, AND INFORMATION PROCESSING METHOD

(71) Applicant: FUJITSU LIMITED, Kawasaki-shi, Kanagawa (JP)

(72) Inventors: Kazuki Matsui, Kawasaki (JP); Kenichi Horio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 271 days.

(21) Appl. No.: 14/334,793

(22) Filed: Jul. 18, 2014

(65) Prior Publication Data
US 2015/0089013 A1 Mar. 26, 2015

(30) Foreign Application Priority Data

Sep. 26, 2013 (JP) .................. 2013-200506

(51) Int. Cl.
*G06F 15/167* (2006.01)
*G06F 3/14* (2006.01)
(52) U.S. Cl.
CPC .......... *G06F 15/167* (2013.01); *G06F 3/1454* (2013.01); *G09G 2350/00* (2013.01); *G09G 2360/122* (2013.01); *G09G 2370/022* (2013.01); *G09G 2370/04* (2013.01)
(58) Field of Classification Search
CPC ................................ G09G 2350/00
See application file for complete search history.

(56) References Cited

U.S. PATENT DOCUMENTS

| 2003/0145100 | A1* | 7/2003 | Marchetto | H04L 47/22 709/233 |
| 2005/0091395 | A1* | 4/2005 | Harris | H04L 29/06 709/232 |
| 2006/0203007 | A1* | 9/2006 | Bullard | G06F 3/1454 345/619 |
| 2009/0024634 | A1 | 1/2009 | Harrang et al. | |
| 2013/0063447 | A1 | 3/2013 | Matsui et al. | |

FOREIGN PATENT DOCUMENTS

| JP | 2002-026986 | 1/2002 |
| JP | 2008-210113 | 9/2008 |
| JP | 2013-062621 | 4/2013 |

OTHER PUBLICATIONS

EESR—Extended European Search Report of European Patent Application No. 14177177.4 mailed Mar. 25, 2015.

* cited by examiner

*Primary Examiner* — Kee M Tung
*Assistant Examiner* — Grace Q Li
(74) *Attorney, Agent, or Firm* — Fujitsu Patent Center

(57) ABSTRACT

An information processing apparatus includes: an image memory that stores therein an image that is to be displayed on a terminal device; a drawing unit that draws a processing result from software into the image memory; a detecting unit that detects an update area containing an update between frames in the image; a splitting unit that splits, the image in the update area; a creating unit that creates, wait insertion data by inserting a wait between each of the pieces of the split data; a changing unit that changes the wait; an acquiring unit that acquires, the available bandwidth and a display update speed that indicates display intervals of the wait insertion data for each wait; and a selecting unit that selects, when a wait in which the available bandwidth is increased and the display update speed is improved, the wait.

4 Claims, 8 Drawing Sheets

INFORMATION PROCESSING APPARATUS, AND INFORMATION PROCESSING METHOD

CROSS-REFERENCE TO RELATED APPLICATIONS

This application is based upon and claims the benefit of priority of the prior Japanese Patent Application No. 2013-200506, filed on Sep. 26, 2013, the entire contents of which are incorporated herein by reference.

FIELD

The embodiment discussed herein is related to an information processing apparatus, an information processing method, and an information processing program.

BACKGROUND

A system called a thin client is known. Thin client systems are configured so that a client terminal is provided with only a minimum of functions and resources, such as applications, files, and the like, are managed by a server.

In a thin client system, the client terminal acts as if the client terminal actually executes processes and stores data although it is in fact the server that makes the client terminal display results of processes executed by the server or data stored in the server.

When transmitting, between the server and the client terminal, screen data that is displayed on the client terminal, an update of a screen occurs due to an operation. If the update of the screen occurs in the thin client system, screen data that indicates a difference of the screen between before and after the update is sent from the server to the client terminal. At this point, if a rotating operation is performed on an object by using, for example, three Dimensional-Computer Aided Design (3D-CAD) or the like, an update occurs in many parts in the screen and screen data related to the difference is sent to the client terminal at a time.

Patent Document 1: Japanese Laid-open Patent Publication No. 2008-210113

Patent Document 2: Japanese Laid-open Patent Publication No. 2002-26986

However, with the technology described above, a transmission delay may sometimes occur.

For example, if the update occurs in many portions of the screen, screen data related to the difference is sent to the client terminal at a time. Specifically, the screen data on the difference is sent to the client terminal as burst transmission in a predetermined time period. Accordingly, in a network between the server and the client terminal, an amount of the traffic exceeds the throughput of network devices and thus a packet loss occurs. Consequently, a transmission delay occurs due to a resend of a packet and a display update speed of the display may sometimes be reduced.

SUMMARY

According to an aspect of an embodiment, an information processing apparatus includes: an image memory that stores therein an image that is to be displayed on a terminal device that is connected via a network; a drawing unit that draws a processing result from software into the image memory; a detecting unit that detects an update area containing an update between frames in the image that is drawn in the image memory; a splitting unit that splits, when an available bandwidth related to communication with the terminal device is equal to or less than a predetermined value, the image in the update area detected by the detecting unit; a creating unit that creates, when pieces of split data that are obtained by splitting the image in the update area are sent, wait insertion data by inserting a wait between each of the pieces of the split data; a changing unit that changes the wait; an acquiring unit that acquires, by sending the wait insertion data to the terminal device for each changed wait, the available bandwidth and a display update speed that indicates display intervals of the wait insertion data for each wait; and a selecting unit that selects, when a wait in which the available bandwidth is increased compared with a case in which one of the waits is not inserted and the display update speed is improved compared with a case in which the one of the waits is not inserted is present from among the waits, the wait.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A preferred embodiment of an information processing apparatus, an information processing method, and an information processing program disclosed in the present invention will be described in detail below with reference to the accompanying drawings. The present invention is not limited to the embodiment. Furthermore, the embodiments can be used in any appropriate combination as long as processes do not conflict with each other.

[a] First Embodiment

System Configuration

Figure 1:
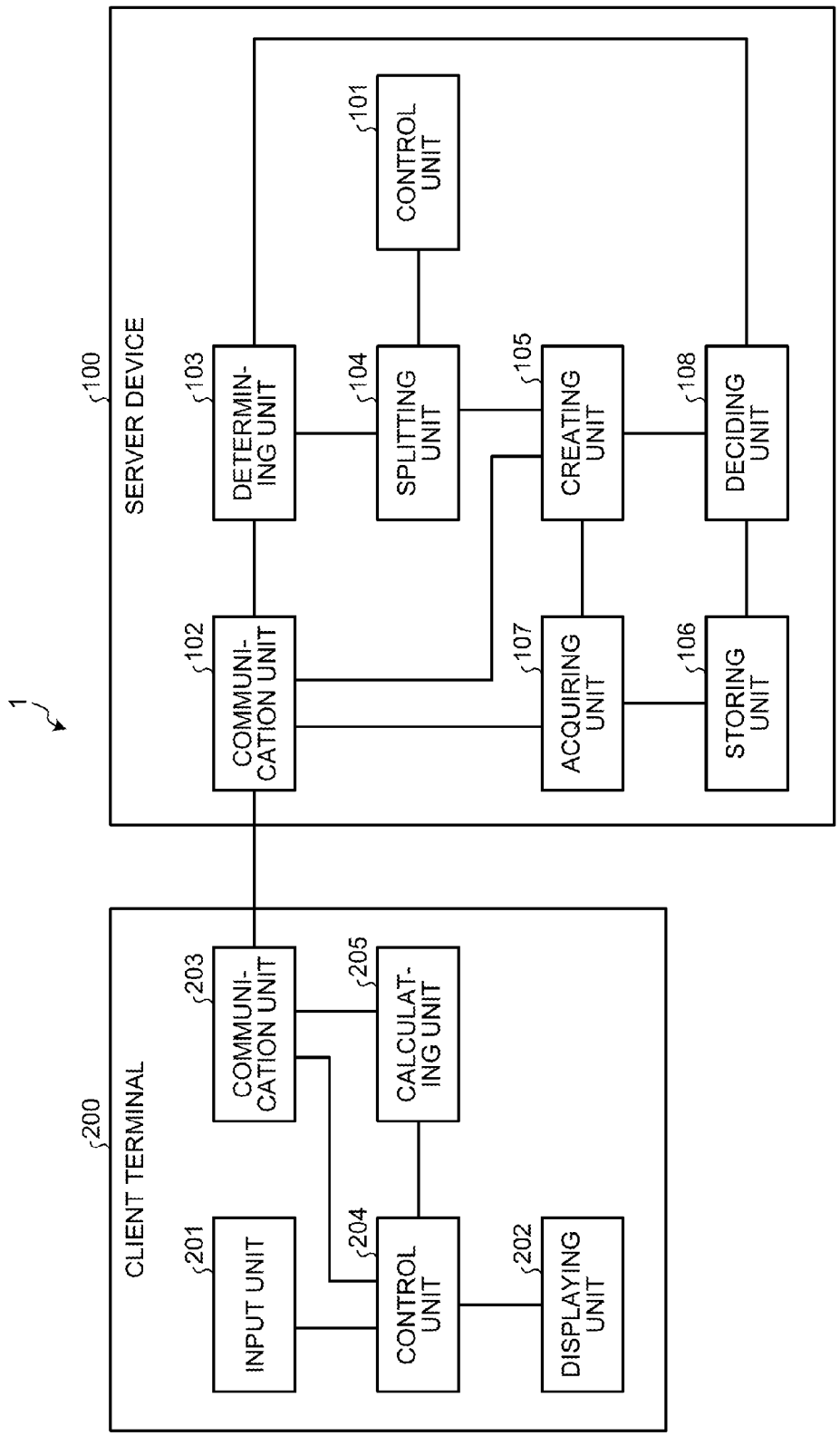
FIG. 1 is a block diagram illustrating an example of the configuration of a thin client system according to an embodiment.

First, a description will be given of the configuration of a thin client system according to an embodiment. FIG. 1 is a block diagram illustrating an example of the configuration of a thin client system according to the embodiment. A thin client system 1 illustrated in FIG. 1 allows a server device 100 to remotely control a screen that is displayed by a client terminal 200. That is, in the thin client system 1, the client terminal 200 acts as if it actually executes processes and stores data although it is in fact the server device 100 that makes the client terminal 200 display results of processes executed by the server device 100 and data stores in the server device 100.

The thin client system 1 illustrated in FIG. 1 includes the server device 100 and the client terminal 200. FIG. 1 illustrates an example of a case in which the single client terminal 200 is connected to the single server device 100; however, an arbitrary number of client terminals may also be connected to the server device 100.

The server device 100 and the client terminal 200 are connected to each other through a predetermined network so that they can mutually communicate with each other. Any type of communication network, such as the Internet, a local area network (LAN) and a virtual private network (VPN), may be used as the network irrespective of the network being wired or wireless. A description will be given with the assumption that a remote frame buffer (RFB) protocol in VNC is used as an example of a communication protocol between the server device 100 and the client terminal 200.

The server device 100 is an example of an information processing apparatus and is a computer that provides a service to remotely control a screen that is to be displayed on the client terminal 200. An application for remote screen control for a server is installed or preinstalled in the server device 100. In a description below, an application for remote screen control for a server may sometimes be referred to as a "server-side remote screen control application".

The server-side remote screen control application has a function of providing a remote screen control service as a basic function. For example, the server-side remote screen control application acquires operation information at the client terminal 200 and then allows an application running in the server device to execute processes requested by the operation on the basis of the operation information. Then, the server-side remote screen control application creates a screen that displays the results of processes executed by the application and then transmits the created screen to the client terminal 200. At this point, the server-side remote screen control application sends a area that is changed and that corresponds to an assembly of pixels at a portion at which a bit map image that was displayed on the client terminal 200 before the present screen is created, i.e., an update rectangular image; however, a shape of the image of the update portion is not limited to rectangular. Any shape other than rectangular may also be used.

The server device 100 determines whether an available bandwidth that can be used in a network for communicating with the client terminal 200 is equal to or less than a predetermined value. If the available bandwidth is equal to or less than the predetermined value, the server device 100 splits the screen image data of the difference of the images that are to be sent to the client terminal 200 into a predetermined number of pieces of data. The server device 100 inserts a wait in order to make an interval between each piece of the split data and then sends, to the client terminal 200, the image data to which a wait is inserted. The server device 100 adjusts the wait on the basis of the available bandwidth and a display update speed (hereinafter, referred to as a display Frames Per Second (FPS)) calculated at the client terminal 200 and then determines a wait in which an available bandwidth is increased and a display FPS is improved. If the available bandwidth is equal to or less than the predetermined value, the server device 100 inserts the determined wait and sends the image data to the client terminal 200.

The client terminal 200 is an example of a terminal device and is a computer on a reception side that receives a remote screen control service provided by the server device 100. An example of the client terminal 200 includes a fixed terminal, such as a personal computer or the like. Another example of the client terminal 200 includes a mobile terminal, such as a tablet device, a smart phone, a mobile phone, a Personal Handyphone System (PHS), a Personal Digital Assistant (PDA), or the like. In the client terminal 200, an application for remote screen control for a client is installed or preinstalled. In a description below, the application for remote screen control for a client may sometimes be referred to as a "client-side remote screen control application".

This client-side remote screen control application has a function of notifying the server device 100 of operation information received via various kinds of input devices, such as a mouse, a keyboard, or the like. For example, the client-side remote screen control application notifies, as operation information, of right or left clicks on a mouse, double clicks or dragging by the mouse, and the amount of movement of the mouse cursor obtained from a moving operation of the mouse. For another example, the client-side remote screen control application notifies, as the operation information, of the amount of rotation of a mouse wheel, the type of pushed key of the keyboard, or the like.

Furthermore, the client-side remote screen control application has a function of displaying images received from the server device 100 on a predetermined displaying unit. For example, when a bit map image having an update rectangular shape is received from the server device 100, the client-side remote screen control application displays the image having the update rectangular shape on the position that is changed from the position at which the previous bit map image was displayed.

Configuration of the Server Device

In the following, a description will be given of a functional configuration of the server device 100 according to the embodiment. As illustrated in FIG. 1, the server device 100 includes a control unit 101, a communication unit 102, a determining unit 103, a splitting unit 104, a creating unit 105, a storing unit 106, an acquiring unit 107, and a deciding unit 108. In the example illustrated in FIG. 1, it is assumed that, in addition to the functional units illustrated in FIG. 1, various functional units, such as various input devices or display devices, included by a known computer are included.

The control unit 101 performs the overall control of the server device 100 and executes the server-side remote screen control application and various applications. Furthermore, the control unit 101 includes an image memory that stores therein an image that is to be displayed on the client terminal 200 and a drawing unit that draws a processing result from software, such as various applications, into the image memory. Furthermore, the control unit 101 includes a detecting unit that detects an update area containing an update between frames in an image that is drawn in the image memory. The image memory, the drawing unit, and the detecting unit are controlled by the server-side remote screen control application and provide a remote screen control service. The control unit 101 executes, for example, a CAD application (hereinafter, simply referred to as CAD) as various applications. When operation information is input from the communication unit 102, the control unit 101 executes the server-side remote screen control application and various applications in accordance with the operation information. The control unit 101 outputs, to the splitting unit 104 by using the server-side remote screen control application, a screen executed by, for example, CAD as difference image data (hereinafter, simply referred to as "image data").

The communication unit 102 is implemented by, for example, a Network Interface Card (NIC) or the like. The communication unit 102 is connected to the client terminal 200 via the network in a wired or wireless manner and is a communication interface that manages communication of information with the client terminal 200. The communication unit 102 receives an available bandwidth and a display FPS from the client terminal 200, outputs the available bandwidth to the determining unit 103 and the acquiring unit 107, and outputs the display FPS to the acquiring unit 107. Furthermore, when wait insertion data or image data is input from the creating unit 105, the communication unit 102 sends the wait insertion data or the image data to the client terminal 200. Furthermore, when the communication unit 102 receives operation information from the client terminal 200, the communication unit 102 outputs the operation information to the control unit 101.

When the available bandwidth is input from the communication unit 102, the determining unit 103 determines whether the available bandwidth is equal to or less than the predetermined value. If the available bandwidth is equal to or less than the predetermined value, the determining unit 103 outputs, to the splitting unit 104, split information that indicates that image data to be sent to the client terminal 200 is split. Furthermore, if the available bandwidth is not equal to or less than the predetermined value or if reset information is input from the deciding unit 108, the determining unit 103 outputs split information indicating that the splitting is not performed to the splitting unit 104. Furthermore, the determining unit 103 sets initial values, such as i, $\Delta T_i$, $\Delta T$, or the like that are used when the adjusting process is performed on a wait such that the initial values can be accessed from each of the functional units.

In the following, a description will be given of an available bandwidth. The available bandwidth mentioned here is, for example, a bandwidth that can be used in a network that connects the client terminal 200 and the server device 100 and that can be calculated from an amount of image data and the time taken to send the image data. If 1 second is needed to send, for example, image data of 1 MByte, an available bandwidth of 8 Mbps is calculated from $(1\times1024\times1024\times8)/1$. The available bandwidth calculated from the amount of data and the time taken to send the image data is an estimated value.

Figure 2:
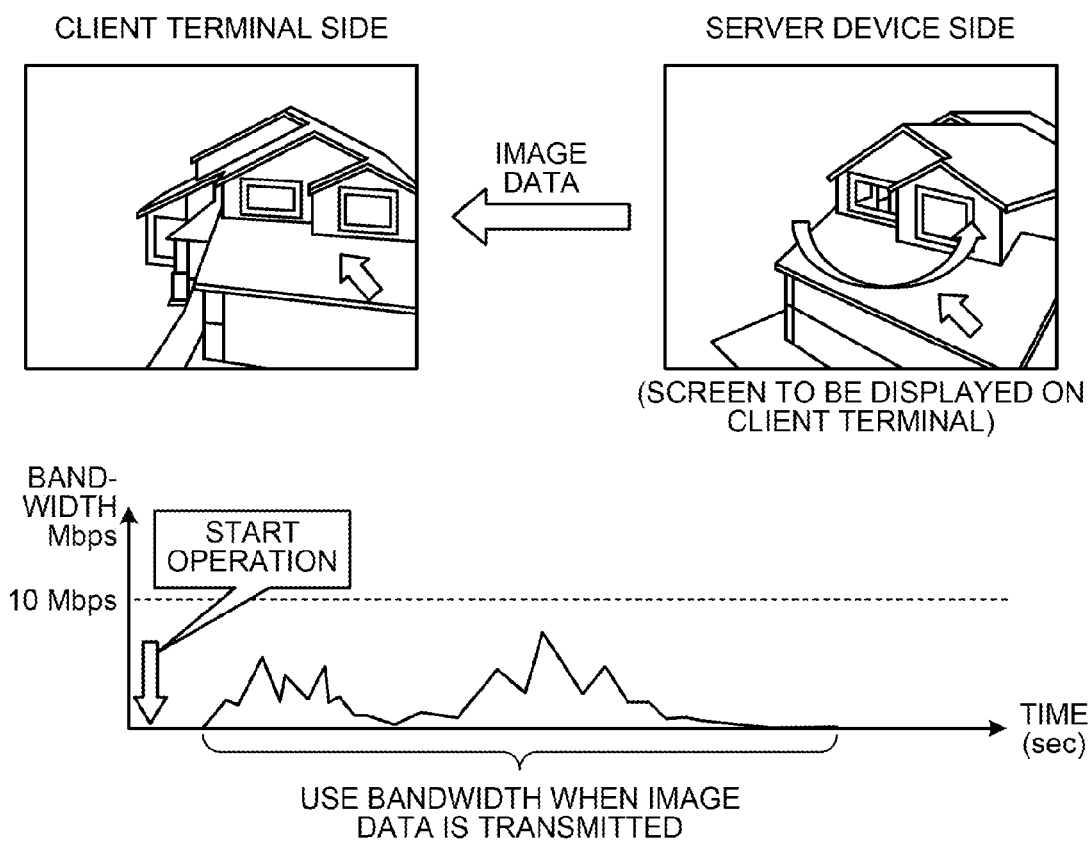
FIG. 2 is a schematic diagram illustrating an example of a use bandwidth used when image data is sent.

In the following, an available bandwidth and image data that is sent from the server device 100 to the client terminal 200 will be described with reference to FIG. 2. FIG. 2 is a schematic diagram illustrating an example of a use bandwidth used when image data is sent. As illustrated in FIG. 2, it is assumed that, for example, CAD is running in the server device 100 and the client terminal 200 performs the operation. At this point, in accordance with the operation information from the client terminal 200, for example, if operation information indicating a rotation operation is sent from the client terminal 200 to the server device 100, a screen is updated in the server device 100 in accordance with the rotation of the object. The server device 100 sends, to the client terminal 200, a difference due to the update of the screen as image data of the difference. In the example illustrated in FIG. 2, the calculated available bandwidth is 10 Mbps. Furthermore, for the image data that is sent from the server device 100 to the client terminal 200, for example, when the use bandwidths calculated for packets are arranged in time series, the use bandwidth when the image data is transmitted is the bandwidth of 10 Mbps or below.

In general, an available bandwidth is set by calculating, when data is received, the average value of available bandwidths obtained from the most recent one second. However, if a screen is significantly updated due to the rotation operation using CAD, the image data may possibly be sent in a short time period that corresponds to burst transmission. At this point, even if the traffic amount of data is within the available bandwidth in terms of the average value that is obtained from the most recent one second; however, in practice, there may be a case in which the available bandwidth or the throughput of the network device exceeds in a short time period.

Figure 3:
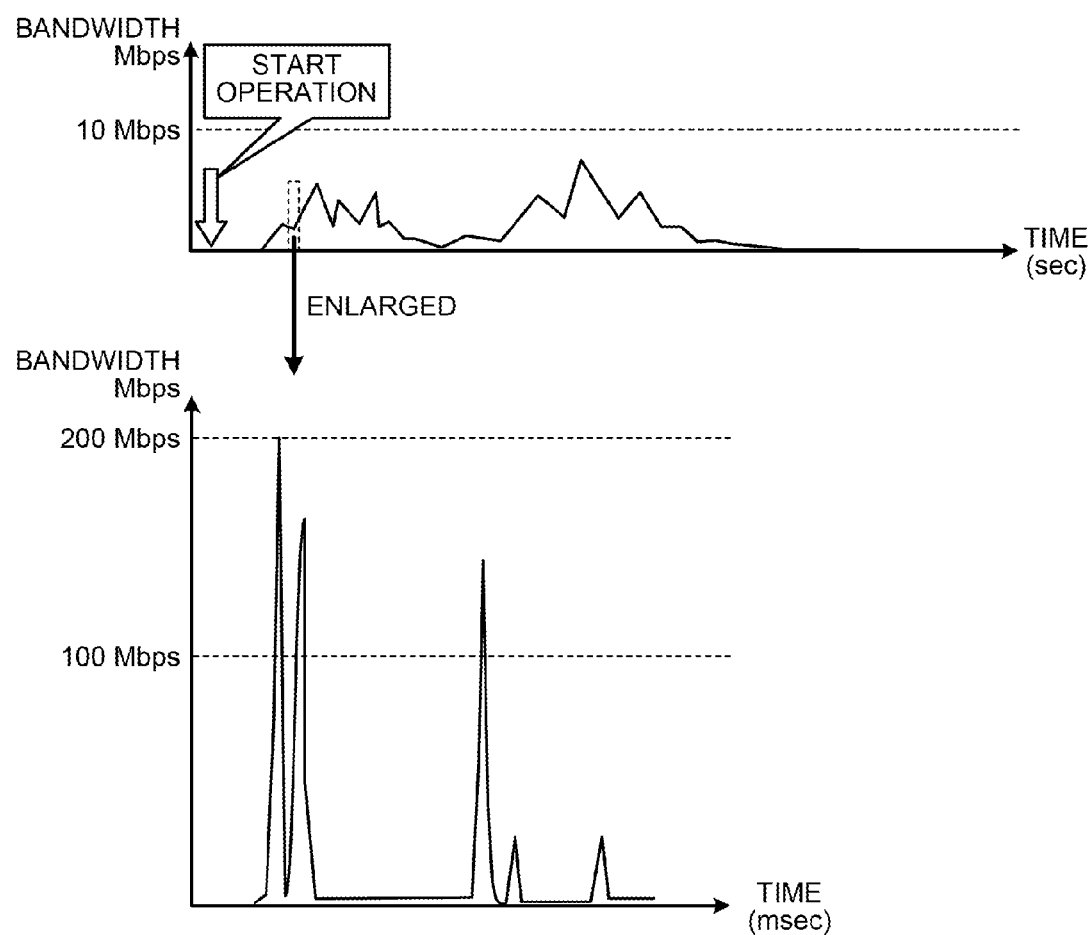
FIG. 3 is a schematic diagram illustrating an example of burst transmission.

FIG. 3 is a schematic diagram illustrating an example of burst transmission. As illustrated in FIG. 3, for example, when use bandwidths calculated for packets are aligned in time series, they seem to be within the available bandwidth; however, if the granularity of the time axis is increased, there may be a case in which the available bandwidth or the throughput of the network device exceeds in a short time period. In the example illustrated in FIG. 3, for example, if image data of 1 Mbit (128 KBytes) is subjected to burst transmission at 5 msec, the traffic amount is momentarily about 200 Mbps. At this point, if the available bandwidth is 10 Mbps and a network device is available for 100 Mbps transmission, both the available bandwidth and the throughput of the network device exceed, resulting in the occurrence of a packet loss in some of transmitted image data. If a packet loss occurs, a retransmission process occurs in the server device 100 and the client terminal 200 and thus the amount of data that can be sent, i.e., an available bandwidth, is reduced. Consequently, a display FPS is decreased in the client terminal 200. Specifically, a user who operates the client terminal 200 feels that a delay occurs in the operation.

A description will be given here by referring back to FIG. 1. The splitting unit 104 receives an input of image data (a difference of image data) from the control unit 101. The image data corresponds to an image in an update area that was detected by a detecting unit in the control unit 101. When split information is input from the determining unit 103, the splitting unit 104 splits the image data to be sent to the client terminal 200 into a predetermined number of pieces of image data. The splitting unit 104 can set the predetermined number of pieces of the image data to be split to, for example, 10 or below. This is because, if the number of splits is increased, a delay becomes large, resulting in a reduction in a display FPS. Furthermore, the splitting unit 104 can set, as the size of a single piece of split data that is to be split, for example, to 100 KBytes. The splitting unit 104 outputs, to the creating unit 105, the split data that is the split image data. Furthermore, if the split information indicates that the splitting is not performed, the splitting unit 104 outputs the image data to the creating unit 105 without processing anything.

The creating unit 105 receives an input of split data or image data from the splitting unit 104. If image data, i.e., image data that is not split, is received, the creating unit 105 outputs the input image data to the communication unit 102. Furthermore, if split data is input, the creating unit 105 inserts a predetermined wait into between the pieces of split data and creates wait insertion data. Furthermore, if wait increase information is input from the acquiring unit 107, the creating unit 105 inserts a predetermined increased wait into between the pieces of input split data and creates wait insertion data. At this point, additional wait increase information is further input from the acquiring unit 107; the creating unit 105 increases the predetermined wait in accordance with the number of inputs; inserts a predetermined increased wait into between the pieces of input split data; and creates wait insertion data. Furthermore, the creating unit 105 may also increase a wait by using i and $\Delta T_i$ that are included in the wait increase information. The creating unit 105 outputs the created wait insertion data to the communication unit 102. Furthermore, the creating unit 105 outputs, to the acquiring unit 107, image data or the wait information that is associated with the created wait insertion data.

In the following, a description will be given of an increase in a predetermined wait. When, for example, a wait is $\Delta T_i$, a predetermined wait is $\Delta T$, and the number of inputs is i, the creating unit 105 increases a wait for the first input on the basis of $\Delta T_i = \Delta T$ and increases a wait for the second input and the subsequent input on the basis of $i=i+1$ and $\Delta T_i = \Delta T_{i-1} + \Delta T$. Furthermore, specifically, for example, when $i=0$ and $\Delta T=5$ msec are used as the initial value, a first wait is $\Delta T_0 = 5$ msec and a second wait is $i=1$ and $\Delta T_1 = \Delta T_0 + \Delta T = 5 + 5 = 10$ msec. Similarly, the wait to be inserted is 15 msec for a third wait and is 20 msec for a fourth wait. Furthermore, i and $\Delta T_1$ are calculated by the acquiring unit 107 and are input to the creating unit 105 as wait increase information.

The creating unit 105 receives an input of decision wait information or reset information from the deciding unit 108. If the decision wait information is input, the creating unit 105 inserts a wait indicated by the decision wait information into between the pieces of split data that are subsequently input, creates wait insertion data, and outputs the data to the communication unit 102. If the reset information is input, the creating unit 105 sets the wait that is to be inserted into between the pieces of split data to 0 msec. At this point, the reset information is also input to the determining unit 103; the data that is input from the splitting unit 104 becomes image data that is not split; and the creating unit 105 outputs the input image data to the communication unit 102.

Figure 4:
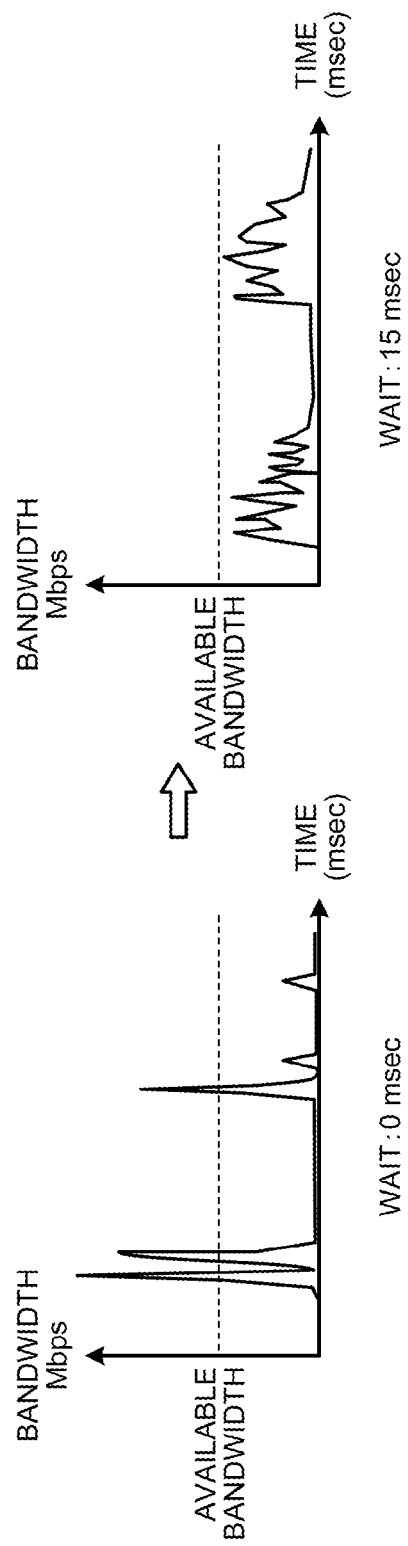
FIG. 4 is a schematic diagram illustrating an example of a use bandwidth depending on whether a wait is present.

In the following, a description will be given of use bandwidths obtained before and after a wait are inserted. FIG. 4 is a schematic diagram illustrating an example of a use bandwidth depending on whether a wait is present. As illustrated in FIG. 4, if a wait is not inserted, for example, 5-msec burst transmission occurs and thus the use bandwidth, i.e., the traffic amount, exceeds the available bandwidth. In contrast, if data is split and a wait of, for example, 15 msec is inserted between the split data, the use bandwidth is within the available bandwidth. Specifically, by inserting a wait into image data, the occurrence of a packet loss in a network can be suppressed and thus a display FPS can be improved.

The storing unit 106 can be implemented by a semiconductor memory device, such as a random access memory (RAM), a flash memory, and the like or a storage device, such as a hard disk, an optical disk, and the like. The storing unit 106 stores therein an available bandwidth and a display FPS that are associated with wait insertion data. For example, the storing unit 106 stores therein, in an associated manner, wait information, i.e., information that indicates a wait inserted into wait insertion data, the available bandwidth, and the display FPS that are used when the client terminal 200 receives the wait insertion data. The storing unit 106 stores therein, in an associated manner, for example, the time at which a wait is not inserted, i.e., the wait of 0 msec, the available bandwidth of 7 Mbps, and the display FPS of "10". Similarly, for example, the storing unit 106 stores therein, in an associated manner, the wait of 5 msec, the available bandwidth of 9 Mbps, and the display FPS of "17" and stores therein, in an associated manner, the wait of 10 msec, the available bandwidth of 12 Mbps, and the display FPS of "18". Furthermore, similarly, for example, the storing unit 106 stores therein, in an associated manner, the wait of 15 msec, the available bandwidth of 14.5 Mbps, and the display FPS of "24" and stores therein, in an associated manner, the wait of 20 msec, the available bandwidth of 14.6 Mbps, and the display FPS of "20".

The acquiring unit 107 receives an input of wait information from the creating unit 105. The wait information is associated with the wait insertion data that is sent from the creating unit 105 to the client terminal 200 via the communication unit 102. Furthermore, the acquiring unit 107 receives an input of an available bandwidth and a display FPS from the communication unit 102. The available bandwidth and the display FPS mentioned here are the available bandwidth and the display FPS of wait insertion data, at the client terminal 200, that is sent from the creating unit 105 to the client terminal 200 via the communication unit 102. When the acquiring unit 107 receives an input of the wait information from the creating unit 105 and receives an input of the associated available bandwidth and the display FPS from the communication unit 102, the acquiring unit 107 associates the wait information with the available bandwidth and the display FPS and then stores there in the storing unit 106. If a wait is 0 msec, this data is also included in the wait information and is associated with an available bandwidth and a display FPS that is used when the client terminal 200 receives image data that is not split.

Furthermore, the acquiring unit 107 stores, in the storing unit 106, a predetermined number of times that is used to increase a wait. The predetermined number of times is previously input by an administrator or the like of the server device 100 by using an input device (not illustrated) and is set to, for example, four. Furthermore, the acquiring unit 107 increases i that manages the number of times of outputs and calculates $\Delta T_i$. Then, the acquiring unit 107 outputs, to the creating unit 105, wait increase information that is used to increase a wait that is to be inserted into split data until the number of times of outputs reaches the predetermined number of times. At this point, the wait increase information includes therein i and $\Delta T_i$. In other words, the acquiring unit 107 is a changing unit that changes a wait that is inserted into split data.

If the wait information indicates 0 msec, the deciding unit 108 reads the associated available bandwidth and the display FPS from the storing unit 106. Furthermore, the deciding unit 108 reads a predetermined number from the storing unit 106 and then reads wait information that does not indicate 0 msec, an available bandwidth, and a display FPS from the storing unit 106 by a predetermined number of times. The deciding unit 108 compares an available bandwidth obtained when wait information indicates 0 msec and a display FPS with an available bandwidth obtained when wait information that does not indicate 0 msec and a display FPS, respectively, and then determines whether wait information in which an available bandwidth is increased and a display FPS is improved is present. If wait information in which an available bandwidth is increased and a display FPS is improved is present, the deciding unit 108 outputs, as decision wait information to the creating unit 105, the wait information that indicates the most improved display FPS. In other words, the deciding unit 108 is a selecting unit that selects, from among pieces of wait information, wait information that indicates the most improved display FPS. If wait information in which an available bandwidth is increased and a display FPS is improved is not present, the deciding unit 108 outputs reset information to the determining unit 103 and the creating unit 105.

Configuration of Client Terminal

In the following, the functional configuration of the client terminal 200 according to the embodiment will be described. As illustrated in FIG. 1, the client terminal 200 includes an input unit 201, a displaying unit 202, a communication unit 203, a control unit 204, and a calculating unit 205. In the example illustrated in FIG. 1, it is assumed that, in addition to the functional units illustrated in FIG. 1, various functional units, such as various input devices or display devices, included by a known computer are included.

The input unit 201 is an input device that receives various operations from a user. The input unit 201 is implemented by, for example, a touch panel, a mouse, a keyboard, or the like. Furthermore, if a touch panel is used, the input unit 201 is integrated with the displaying unit 202 that is a display device. The input unit 201 sends operation information in accordance with an operation performed by a user to the server device 100 via the communication unit 203.

The displaying unit 202 is a display device that displays various kinds of information and is implemented by, for example, a liquid crystal display or the like. Furthermore, if a touch panel is used as the input unit 201, the displaying unit 202 is integrated with the input unit 201. The displaying unit 202 displays image data that is input from the control unit 204.

The communication unit 203 is implemented by, for example, a NIC or the like. The communication unit 203 is connected to the server device 100 via the network in a wired or wireless manner and is a communication interface that manages communication of information with the server device 100. When the communication unit 203 receives wait insertion data or image data from the server device 100, the communication unit 203 outputs the data to the control unit 204. The communication unit 203 sends, to the calculating unit 205, the transmission time of the received wait insertion data of the image data, an amount of data, and the reception completion time. Furthermore, the communication unit 203 sends, to the server device 100 via the network, the available bandwidth and the display FPS that are input from the calculating unit 205.

The control unit 204 performs the overall control of the client terminal 200 and executes the client-side remote screen control application. If wait insertion data or image data is input from the communication unit 203, the control unit 204 outputs the data to the displaying unit 202 and displays the data. Furthermore, the control unit 204 calculates a display FPS on the basis of the result that has been output to the displaying unit 202 and then outputs the calculated display FPS.

When the calculating unit 205 receives an input of the transmission time of the wait insertion data or the image data, the amount of data, and the reception completion time from the communication unit 203, the calculating unit 205 calculates the transmission time period on the basis of the transmission time and the reception completion time and then calculates an available bandwidth on the basis of the calculated transmission time period and the amount of data. The calculating unit 205 outputs the calculated available bandwidth to the communication unit 203. Furthermore, if a display FPS is input from the control unit 204, the calculating unit 205 outputs the received display FPS together with the available bandwidth to the communication unit 203.

In the following, the operation of the thin client system according to the embodiment will be described.

Figure 5:
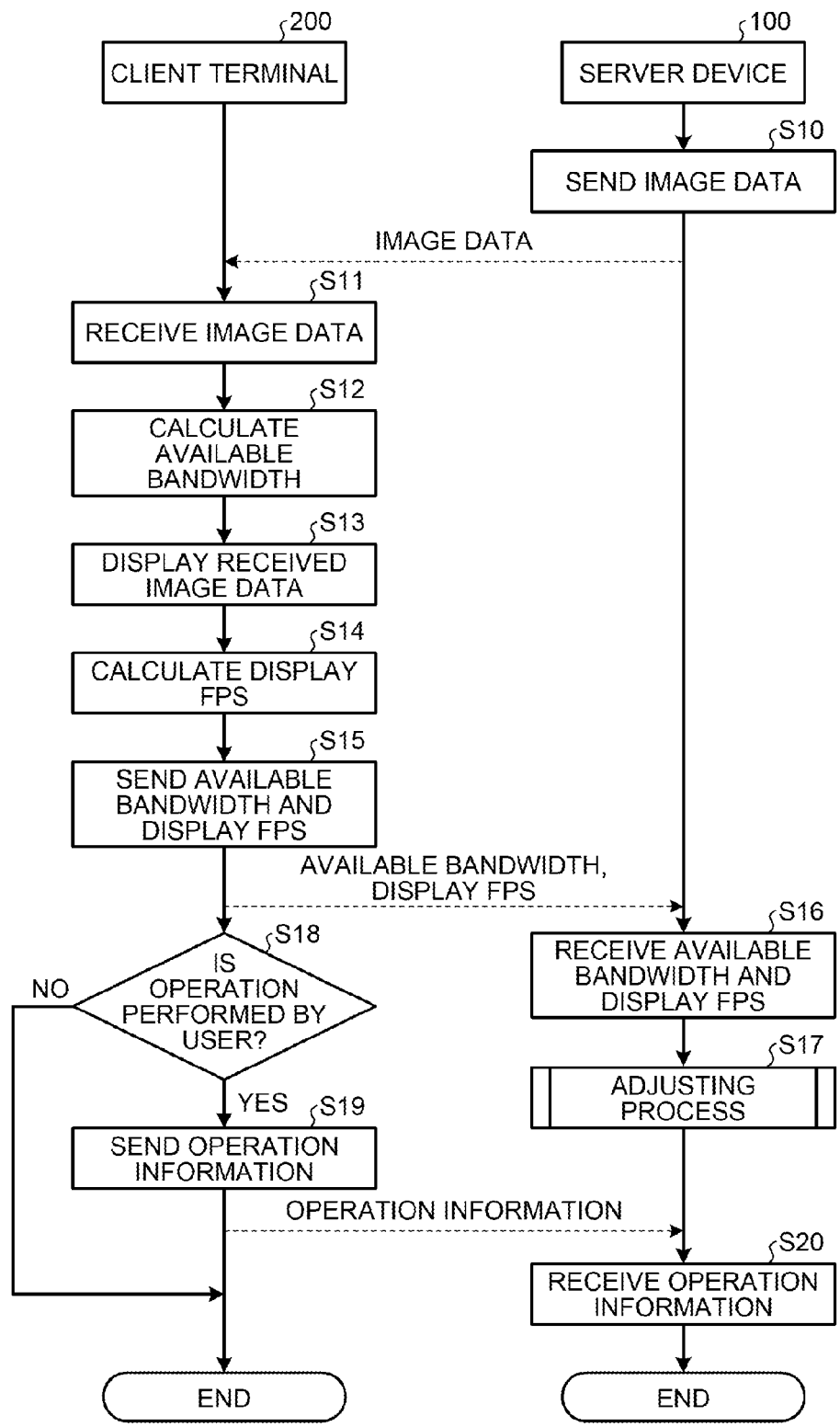
FIG. 5 is a sequence diagram illustrating an example of an operation of the thin client system according to the embodiment.

FIG. 5 is a sequence diagram illustrating an example of an operation of the thin client system according to the embodiment. First, the server device 100 sends, for example, a screen of an application, such as CAD, i.e., image data of an image that is displayed on the screen of the client terminal 200, to the client terminal 200 (Step S10).

The client terminal 200 receives the image data (Step S11). The calculating unit 205 in the client terminal 200 calculates an available bandwidth of the received data (Step S12). Furthermore, the control unit 204 outputs the image data to the displaying unit 202 and displays the data (Step S13). The control unit 204 calculates a display FPS on the basis of the result of the output to the displaying unit 202 and then outputs the calculated display FPS to the calculating unit 205 (Step S14). The calculating unit 205 outputs the available bandwidth and the display FPS to the communication unit 203 and then the communication unit 203 sends the available bandwidth and the display FPS to the server device 100 via the network (Step S15).

The server device 100 receives the available bandwidth and the display FPS (Step S16). When the server device 100 receives the available bandwidth and the display FPS, the server device 100 executes an adjusting process (Step S17).

Figure 6:
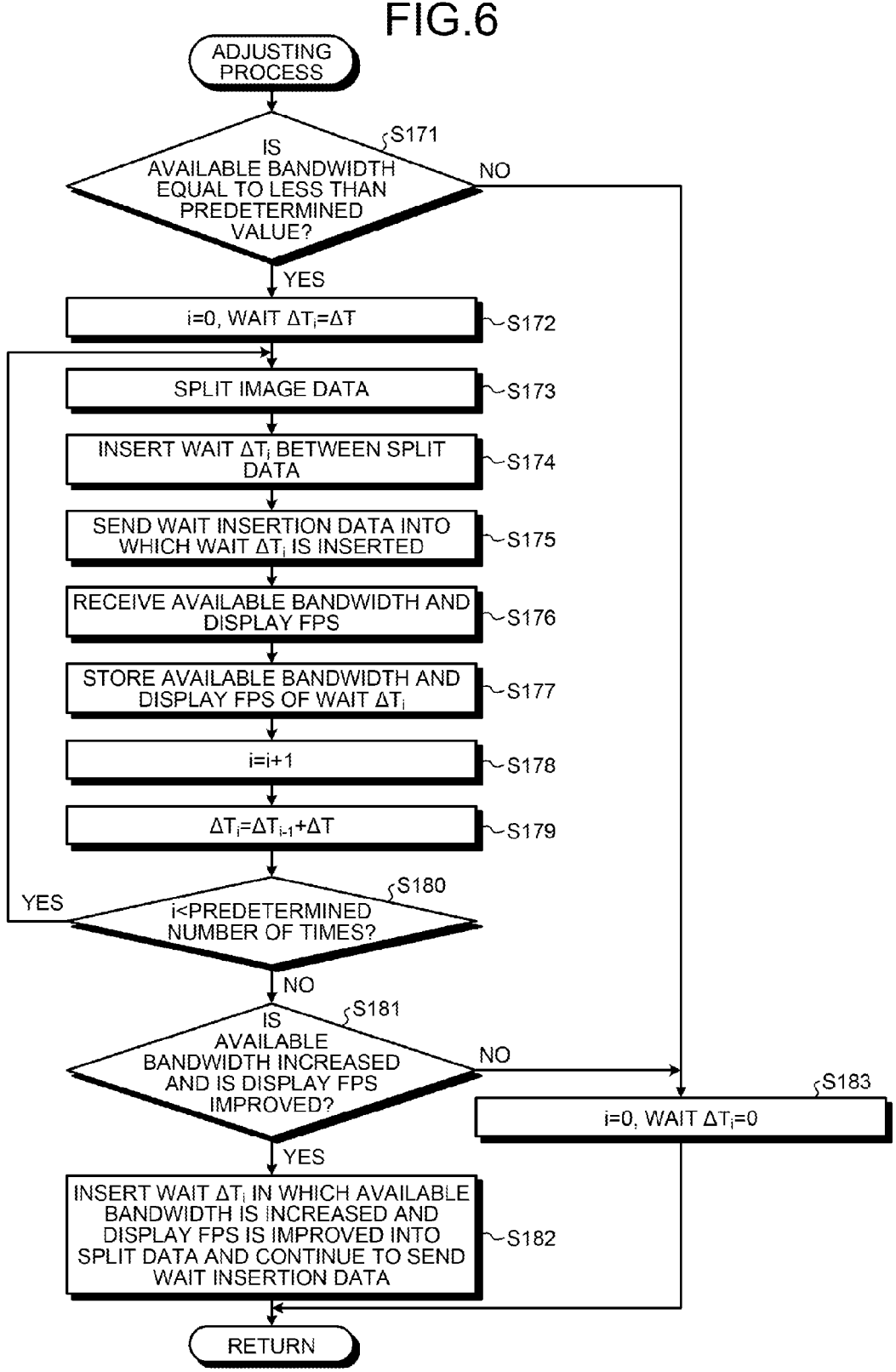
FIG. 6 is a flowchart illustrating an example of an adjusting process performed by the server device.

In the following, the adjusting process for a wait that is performed in order to improve an available bandwidth and a display FPS will be described with reference to FIG. 6. FIG. 6 is a flowchart illustrating an example of an adjusting process performed by the server device. The communication unit 102 outputs the received available bandwidth to the determining unit 103 and the acquiring unit 107 and outputs the display FPS to the acquiring unit 107. The determining unit 103 determines whether the input available bandwidth is equal to or less than a predetermined value (Step S171). If the input available bandwidth is equal to or less than a predetermined value (Yes at Step S171), the determining unit 103 outputs, to the splitting unit 104, split information that is used to split image data that is to be sent to the client terminal 200. Furthermore, the determining unit 103 sets, as an initial setting of the adjusting process, i to "0" and the wait $\Delta T_0$ to $\Delta T$ (Step S172).

The splitting unit 104 receives an input of the image data from the control unit 101 and receives an input of the split information from the determining unit 103. When the splitting unit 104 receives an input of the split information, the splitting unit 104 splits the image data that is to be sent to the client terminal 200 into a predetermined number of pieces of data (Step S173). The splitting unit 104 outputs split data that is the split image data to the creating unit 105.

When the creating unit 105 receives an input of the image data from the splitting unit 104, the creating unit 105 inserts a wait $\Delta T_0$ between the pieces of the split data and then creates wait insertion data (Step S174). Specifically, the creating unit 105 creates the wait insertion data in which $\Delta T$ is inserted between the pieces of the split data. The creating unit 105 outputs the created wait insertion data to the communication unit 102. Furthermore, the creating unit 105 outputs the wait information ($\Delta T_0$) that is associated with the created wait insertion data to the acquiring unit 107. The communication unit 102 sends the wait insertion data to the client terminal 200 (Step S175).

The communication unit 102 receives, from the client terminal 200, the available bandwidth and the display FPS that is associated with the wait insertion data into which the wait $\Delta T_0$ is inserted (Step S176). The communication unit 102 outputs the available bandwidth to the determining unit 103 and the acquiring unit 107 and then outputs the display FPS to the acquiring unit 107. The acquiring unit 107 receives an input of the wait information ($\Delta T_0$) from the creating unit 105 and receives an input of the available bandwidth and the display FPS from the communication unit 102. The acquiring unit 107 stores, in an associated manner in the storing unit 106, available bandwidth and the display FPS indicated by the wait information ($\Delta T_0$) (Step S177).

The acquiring unit 107 increments i, i.e., increments i by one to obtain "1" (Step S178), substitutes i=1 for the wait $\Delta T_1$ to obtain $\Delta T_1$ and then $\Delta T_1$ is set to $2\Delta T$ from the equation of $\Delta T_1 = \Delta T_0 + \Delta T$ (Step S179). The acquiring unit 107 determines whether i is less than the predetermined number of times (Step S180). If i is less than the predetermined number of times (Yes at Step S180), the acquiring unit 107 outputs, as wait increase information to the creating unit 105, the incremented i=1 and $\Delta T_1$ and then returns to Step S173. If i is equal to or greater than the predetermined number of times (No at Step S180), the acquiring unit 107 does not output the wait increase information to the creating unit 105. The server device 100 repeats the processes at Steps S173 to S179 until i becomes equal to or greater than the predetermined number of times and then acquires the available bandwidth and the display FPS that are associated with the wait $\Delta T_i$ that corresponds to the predetermined number of times.

The deciding unit 108 reads the predetermined number of times from the storing unit 106 and then reads, from the storing unit 106, wait information that does not indicate 0 msec, the available bandwidth, and the display FPS by the number of times corresponding to the predetermined number of times. Specifically, the deciding unit 108 monitors the storing unit 106 and, when the wait information, the available bandwidth, and the display FPS are written into the storing unit 106 by the acquiring unit 107 until the number of times reaches the predetermined number of times, the deciding unit 108 reads the wait information, the available bandwidth, and the display FPS from the storing unit 106. Furthermore, if the wait information is 0 msec, the deciding unit 108 reads the associated available bandwidth and the display FPS from the storing unit 106.

The deciding unit 108 compares the available bandwidth and the display FPS associated with the wait information that indicates 0 msec with the available bandwidth and the display FPS, respectively, associated with the wait information that does not indicate 0 msec. After the comparison, the deciding unit 108 determines whether wait information in which the available bandwidth is increased and the display FPS is improved is present (Step S181). If wait information in which the available bandwidth is increased and the display FPS is improved is present (Yes at Step S181), the deciding unit 108 outputs the wait information that indicates the most improved display FPS to the creating unit 105 as the decision wait information.

When the creating unit 105 receives an input of the decision wait information from the deciding unit 108, the creating unit 105 inserts the wait indicated by the decision wait information into the pieces of split data that are subsequently input, creates wait insertion data, outputs the data to the communication unit 102 (Step S182), and ends the adjusting process.

If wait information in which the available bandwidth is increased and the display FPS is improved is not present (No at Step S181), the deciding unit 108 outputs the reset information to the determining unit 103 and the creating unit 105. When the determining unit 103 receives an input of the reset information from the deciding unit 108, the determining unit 103 outputs split information indicating that the splitting is not performed to the splitting unit 104. Furthermore, if the reset information is input, the creating unit 105 resets the wait $\Delta T_i$ that is inserted into pieces of split data to 0 msec. Furthermore, if wait information indicating that a wait is 0 msec is input from the creating unit 105, the acquiring unit 107 resets i to "0" (Step S183). When the reset of i and the wait $\Delta T_i$ has been completed, the creating unit 105 and the acquiring unit 107 end the adjusting process. Furthermore, if the available bandwidth is not equal to or less than a predetermined value (No at Step S171), the determining unit 103 outputs the split information indicating that the splitting is not performed to the splitting unit 104, resets i to "0", resets $\Delta T_i$ to 0 msec, and then ends the adjusting process (Step S183). After the adjusting process, by splitting image data that is to be sent from the server device 100 to the client terminal 200 and inserting a wait, it is possible to prevent a transmission delay and to improve an available bandwidth and a display update speed.

A description will be given here by referring back to FIG. 5. The client terminal 200 determines whether an operation is performed by a user (Step S18). If an operation is performed by a user (Yes at Step S18), the client terminal 200 sends operation information to the server device 100 (Step S19). If an operation is not performed by a user (No at Step S18), the client terminal 200 ends the process.

When the communication unit 102 in the server device 100 receives the operation information (Step S20), the communication unit 102 outputs the operation information to the control unit 101. When the control unit 101 receives an input of the operation information from the communication unit 102, the control unit 101 executes the server-side remote screen control application and various applications in accordance with the operation information and then ends the series of the processes. By repeating, in the thin client system 1, the series of processes illustrated in FIGS. 5 and 6, a user can operate, via the client terminal 200, the application running on the server device 100.

Figure 7:
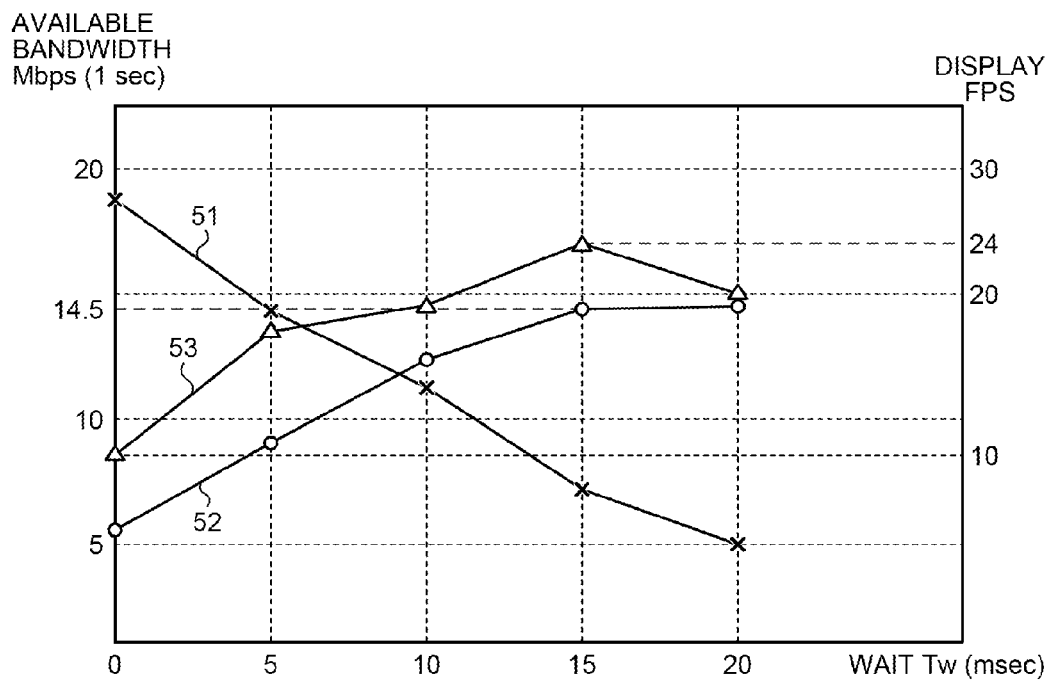
FIG. 7 is a schematic diagram illustrating an example of the relationship among a wait, an available bandwidth, and a display FPS.
Figure 8:
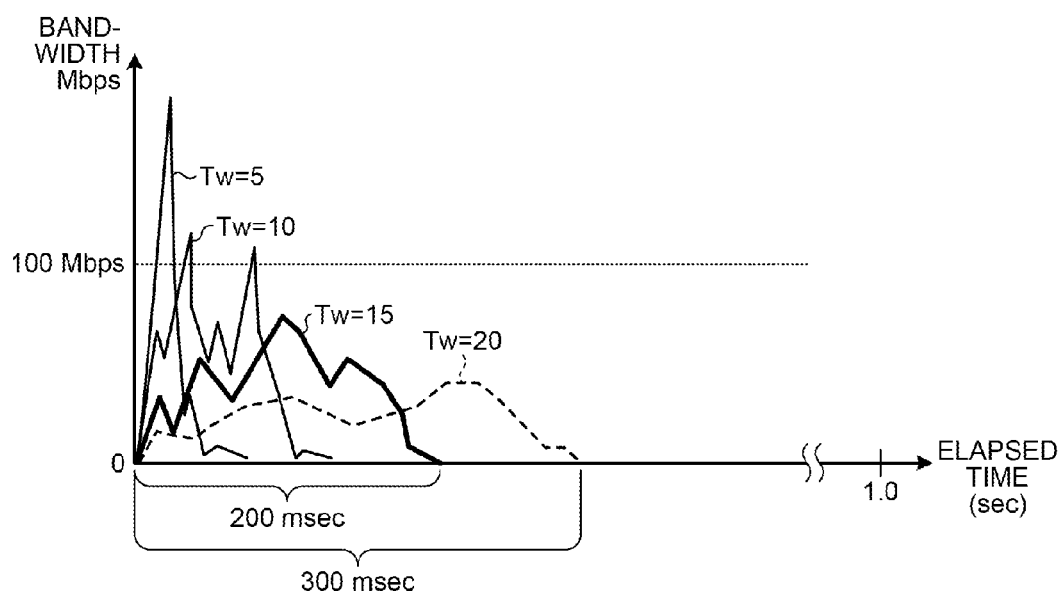
FIG. 8 is a schematic diagram illustrating an example of variations in a use bandwidth according to each wait.

In the following, an available bandwidth and a display FPS obtained when a wait is changed will be described with reference to FIGS. 7 and 8. FIG. 7 is a schematic diagram illustrating an example of the relationship among a wait, an available bandwidth, and a display FPS. In FIGS. 7 and 8, the wait $\Delta T_i$ is represented by Tw. As illustrated in FIG. 7, there is a case in which available bandwidth is increased and there is a case in which available bandwidth is decreased due to a wait being inserted. FIG. 7 illustrates a case in which, four types of time, for example, 5, 10, 15, and 20 msec, are used as a wait. A graph 51 indicates an available bandwidth and indicates a case in which the available bandwidth is decreased due to a wait being inserted. Furthermore, the graph 51 indicates a case in which a decrease in the available bandwidth is not caused by the occurrence of a packet loss due to a microburst and a case in which another user sends a large amount data by using a communication network due to, for example, file transmission. In such cases, the available bandwidth is decreased as the number of waits that are inserted.

A graph 52 indicates an available bandwidth and indicates a case in which a decrease in the available bandwidth is due to the occurrence of a packet loss due to a microburst. A graph 53 indicates the display FPS that is associated with the graph 52. In the graph 52, when a wait is inserted, the available bandwidth is increased as follows: when a wait is not inserted, the available bandwidth is 6 Mbps; when a wait of 5 msec is inserted, the available bandwidth is 9 Mbps; when a wait of 10 msec is inserted, the available bandwidth is 12.5 Mbps; and when a wait of 15 or a wait of 20 msec is inserted, the available bandwidth is 14.5 Mbps. Furthermore, in the associated graph 53, when a wait is not inserted, the display FPS is 10 FPS; when a wait of 5 msec is inserted, the display FPS is 17 FPS; when a wait of 10 msec is inserted, the display FPS is 18 FPS; when a wait of 15 msec is inserted, the display FPS is 24 FPS; and when a wait of 20 msec, the display FPS is 20 FPS. In other words, the cases of the graph 52 and the graph 53 correspond to a case in which wait information in which the available bandwidth is increased and the display FPS is improved is present. Accordingly, because the wait Tw in which display FPS is improved the most is 15 msec, 15 msec can be set for the decision wait information.

FIG. 8 is a schematic diagram illustrating an example of variations in a use bandwidth according to each wait. As illustrated in FIG. 8, by inserting the wait Tw, the peak value of the use bandwidth due to the microburst is gradually decreased. In the example illustrated in FIG. 8, in a case of wait Tw=5 and 10 msec, the available bandwidth exceeds 100 Mbps that is the throughput of the network device. However, in a case of wait Tw=15 and 20 msec, the available bandwidth is below 100 Mbps. In a case of wait Tw=15 and 20 msec, the overall transmission time period of each pieces of the split data are 200 msec and 300 msec and the display FPS of each pieces of the split data are 24 FPS and 20 FPS. If the number of splits is, for example, 10, the transmission time period of the split data is 6.5 msec, and the wait Tw is 15 msec, the transmission time period is 6.5×10+15×9=200 msec. The transmission time period influences the display FPS. As the transmission time period increases, an operation delay increases and the display FPS decreases. For example, if the transmission time period exceeds 300 msec, the FPS is decreased and an operational feeling is degraded. Accordingly, in the example illustrated in FIG. 8, an optimum wait Tw is a case when the wait Tw is 15 msec, in which the available bandwidth is within the throughput of the network device and the transmission time period is short.

As described above, the server device 100 that is an information processing apparatus stores, in the image memory, an image that is displayed on the client terminal 200 that is connected via a network and draws a processing result executed by software in the image memory. Furthermore, the server device 100 detects an update area containing an update between frames in an image that is drawn in the image memory and splits, when the available bandwidth related to the communication with the client terminal 200 is equal to or less than a predetermined value, the image in the detected update area. Furthermore, when the server device 100 sends split data that is obtained by splitting the image in the update area, the server device 100 inserts a wait between each of the pieces of the split data, creates wait insertion data, and changes the wait. Furthermore, by sending the wait insertion data to the client terminal 200 for each changed wait, the server device 100 acquires an available bandwidth and a display update speed that indicates display intervals of the wait insertion data for each wait. Furthermore, if a wait in which the available bandwidth is increased compared with a case in which a wait is not inserted and the display update speed is improved compared with a case in which a wait is not inserted is present from among waits, the server device 100 selects the wait. Consequently, a transmission delay can be suppressed.

Furthermore, if the available bandwidth is not equal to or less than the predetermined value, the server device 100 sets a wait to zero. Consequently, it is possible to determine whether a wait is to be inserted in accordance with the variation in the available bandwidth.

Furthermore, in the embodiment described above, a wait is increased every 5 msec as an example of inserting a wait; however, the embodiment is not limited thereto. For example, the server device 100 may also increase a wait at an interval of, for example, 1 msec.

Furthermore, in the embodiment described above, the client terminal 200 calculates an available bandwidth and a display FPS; however, the embodiment is not limited thereto. For example, the client terminal 200 sends a reception completion time of wait insertion data or image data and sends an output result with respect to the displaying unit 202 to the server device 100. When the server device 100 receives the reception completion time and the output result, the server device 100 can calculate an available bandwidth on the basis of the time of receipt, the transmission time of the wait insertion data, and the amount of data and can calculate a display FPS on the basis of the output result.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the acquiring unit 107 may also be integrated with the deciding unit 108.

Furthermore, all or any part of the processing functions performed by each unit may also be executed by a central processing unit (CPU) or a microcomputer, such as a micro processing unit (MPU) or a micro controller unit (MCU)). Furthermore, all or any part of the processing functions may also be executed by programs analyzed and executed by the CPU or the microcomputer, such as the MPU or the MCU, or executed by hardware by wired logic.

Figure 9:
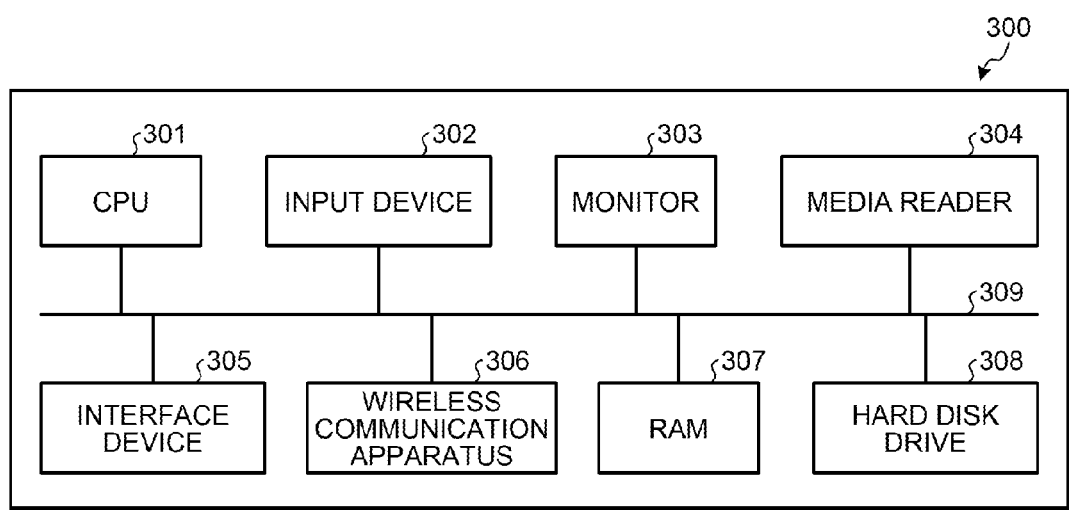
FIG. 9 is a block diagram illustrating an example of a computer that executes an information processing program.

Various kinds of processes described in the above embodiments can be implemented by programs prepared in advance and executed by a computer. Accordingly, in the following, a computer that executes programs having the same function as that described in the embodiment described above will be described as an example. FIG. 9 is a block diagram illustrating an example of a computer that executes an information processing program.

As illustrated in FIG. 9, a computer 300 includes a CPU 301 that executes various arithmetic processing, an input device 302 that receives an input of data from a user, and a monitor 303. Furthermore, the computer 300 includes a media reader 304 that reads a program or the like from a storage medium, an interface device 305 for connecting to another device, and a wireless communication apparatus 306 that connects to the other device in a wireless manner. Furthermore, the computer 300 includes a RAM 307 that temporarily stores various kinds of information and a hard disk drive 308. Each of the devices 301 to 308 are connected to a bus 309.

The hard disk drive 308 stores therein an information processing program having the same function as that performed by each of the processing units, such as the control unit 101, the determining unit 103, the splitting unit 104, the creating unit 105, the acquiring unit 107, and the deciding unit 108 illustrated in FIG. 1. Furthermore, the hard disk drive 308 stores therein various kinds of data that implements the information processing programs. The interface device 305 and the wireless communication apparatus 306 have the same function as that performed by the communication unit 102 illustrated in FIG. 1.

The CPU 301 reads each of the programs stored in the hard disk drive 308, loads the programs in the RAM 307, and executes the programs, thereby performing various processes. Furthermore, these programs allows the computer 300 to function as the control unit 101, the determining unit 103, the splitting unit 104, the creating unit 105, the acquiring unit 107, and the deciding unit 108 illustrated in FIG. 1.

The information processing programs described above are not always stored in the hard disk drive 308. For example, the computer 300 may also read and execute programs stored in a computer readable recording medium. Examples of the computer recording medium include a portable recording medium, such as a CD-ROM, a DVD disk, or a universal serial bus (USB) memory, a semiconductor memory, such as a flash memory, and a hard disk drive. Furthermore, the information processing programs may also be stored in a device connected to, for example, a public circuit, the Internet, a local area network (LAN), or the like and the computer 300 may also read and execute the information processing programs from the recording medium described above.

According to an aspect of an embodiment of the present invention, an advantage is provided in that a transmission delay can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 an image memory that stores therein an image that is to be displayed on a terminal device that is connected via a network; and
 a processor coupled to the image memory, the processor executes a process comprising:
 (i) drawing a processing result from software into the image memory;
 (ii) detecting an update area containing an update between frames in the image that is drawn in the image memory;
 (iii) splitting, when an available bandwidth related to communication with the terminal device is equal to or less than a predetermined value, the image in the detected update area;
 (iv) creating wait insertion data by inserting a wait between each of pieces of split data that are obtained by splitting the image in the update area;
 (v) sending the wait insertion data to the terminal device;
 (vi) changing the length of the wait;
 (vii) repeating (iv) and (v) using the wait whose length is changed in (vi);
 (viii) acquiring the available bandwidth and a display update speed that indicates display intervals of the wait insertion data for each wait of different length; and
 (ix) selecting, when the available bandwidth is increased compared with a case in which the wait of a predetermined length is not inserted and the display update speed is improved compared with a case in which the wait of a predetermined length is not inserted, the wait of the predetermined length.

2. The information processing apparatus according to claim 1, wherein, when the available bandwidth is not equal to or less than the predetermined value, the selecting sets the wait to zero.

3. An information processing method comprising:
 storing, in an image memory performed by an information processing apparatus, an image that is to be displayed on a terminal device that is connected via a network;
 (i) drawing, performed by the information processing apparatus, a processing result from software into the image memory;
 (ii) detecting, performed by the information processing apparatus, an update area containing an update between frames in the image that is drawn in the image memory;
 (iii) splitting, performed by the information processing apparatus, when an available bandwidth related to communication with the terminal device is equal to or less than a predetermined value, the image in the detected update area;
 (iv) creating, performed by the information processing apparatus, wait insertion data by inserting a wait between each of pieces of split data that are obtained by splitting the image in the update area;
 (v) sending the wait insertion data to the terminal device;
 (vi) changing, performed by the information processing apparatus, the length of the wait;
 (vii) repeating (iv) and (v) using the wait whose length is chanced in (vi);
 (viii) acquiring the available bandwidth and a display update speed that indicates display intervals of the wait insertion data for each wait of different length; and
 (ix) selecting, performed by the information processing apparatus, when the available bandwidth is increased compared with a case in which the wait of a predetermined length is not inserted and the display update speed is improved compared with a case in which the wait of a predetermined length is not inserted, the wait of the predetermined length.

4. A non-transitory computer-readable recording medium having stored therein an information processing program causing an information processing apparatus to execute a process comprising:
 storing, in an image memory, an image that is to be displayed on a terminal device that is connected via a network;
 (i) drawing a processing result from software into the image memory;
 (ii) detecting an update area containing an update between frames in the image that is drawn in the image memory;
 (iii) splitting, when an available bandwidth related to communication with the terminal device is equal to or less than a predetermined value, the image in the detected update area;
 (iv) creating wait insertion data by inserting a wait between each of pieces of split data that are obtained by splitting the image in the update area;
 (v) sending the wait insertion data to the terminal device;
 (vi) changing the length of the wait;
 (vii) repeating (iv) and (v) using the wait whose length is changed in (vi);

(viii) acquiring the available bandwidth and a display update speed that indicates display intervals of the wait insertion data for each wait of different length; and (ix) selecting, when the available bandwidth is increased compared with a case in which the wait of a predetermined length is not inserted and the display update speed is improved compared with a case in which the wait of a predetermined length is not inserted, the wait of the predetermined length.

\* \* \* \* \*